United States Patent
Rajani et al.

(10) Patent No.: US 10,373,077 B2
(45) Date of Patent: Aug. 6, 2019

(54) ACCURATELY DETERMINING REAL TIME PARAMETERS DESCRIBING VEHICLE MOTION BASED ON MULTIPLE DATA SOURCES

(71) Applicant: Athena Vision LLC, Long Island, NY (US)

(72) Inventors: Purshotam Rajani, San Francisco, CA (US); Gaurav R. Nukala, Milpitas, CA (US); Gokulnath Coimbatore Kannan, Cupertino, CA (US); Blair R. Essy, Portland, OR (US)

(73) Assignee: ATHENA VISION, LLC, Long Island, NY (US)

( * ) Notice: Subject to any disclaimer, the term of this patent is extended or adjusted under 35 U.S.C. 154(b) by 13 days.

(21) Appl. No.: 15/291,455

(22) Filed: Oct. 12, 2016

(65) Prior Publication Data

US 2017/0103588 A1 Apr. 13, 2017

Related U.S. Application Data

(60) Provisional application No. 62/241,044, filed on Oct. 13, 2015.

(51) Int. Cl.
*G06N 20/00* (2019.01)
*G07C 5/08* (2006.01)
*B60R 16/023* (2006.01)
*G07C 5/00* (2006.01)

(52) U.S. Cl.
CPC ......... *G06N 20/00* (2019.01); *B60R 16/0231* (2013.01); *G07C 5/0808* (2013.01); *G07C 5/008* (2013.01)

(58) Field of Classification Search
USPC .......................................................... 701/37
See application file for complete search history.

(56) References Cited

U.S. PATENT DOCUMENTS

| | | | |
|---|---|---|---|
| 5,917,434 A | 6/1999 | Murphy | |
| 2002/0049538 A1 | 4/2002 | Knapton et al. | |
| 2002/0065089 A1 | 5/2002 | Soliman et al. | |
| 2006/0122749 A1 | 6/2006 | Phelan et al. | |
| 2014/0067491 A1 | 3/2014 | James et al. | |
| 2015/0046060 A1 | 2/2015 | Nikovski et al. | |

OTHER PUBLICATIONS

PCT International Search Report and Written Opinion, PCT Application No. PCT/US16/56675, dated Jan. 13, 2017, 19 pages.

*Primary Examiner* — Lam S Nguyen
(74) *Attorney, Agent, or Firm* — Fox Rothschild LLP

(57) ABSTRACT

A multi-modal meter of a vehicle obtains information from multiple sources to determine the most accurate values of motion parameters of the vehicle. The multi-modal meter obtains data describing motion of a vehicle from various sources including an on-board diagnostics (OBD) and global positioning system (GPS.) The dynamically evaluates the signal sources for their accuracy as the vehicle travels. The multi-modal meter selects different signal sources for different portions of a ride and uses the data from the selected signal sources to determine the most accurate motion parameters. The multi-modal meter use machine learning techniques to generate metadata used by an engine configured to determine the most accurate values of motion parameters of the vehicle.

20 Claims, 12 Drawing Sheets

ACCURATELY DETERMINING REAL TIME PARAMETERS DESCRIBING VEHICLE MOTION BASED ON MULTIPLE DATA SOURCES

FIELD

This disclosure relates in general to determining motion parameters describing a travelling vehicle and more specifically to dynamically changing signal sources for accurate determination of motion parameters of a vehicle that is travelling.

BACKGROUND

Several applications utilize parameters that describe motion of a moving vehicle, for example, velocity, distance travelled, time of travel, and so on. Conventional techniques for determining motion parameters often provide inaccurate values. For example, certain systems interface with the vehicle's transmission and receive electric pulses based on the distance travelled by the vehicle. These systems require periodic manual calibration. The manual calibration process is cumbersome and consumes resources. Furthermore, the calibration is performed under certain conditions, for example, tire pressure. The actual conditions in which the vehicle operates may be different from the conditions under which the system was calibrated. This can lead to inaccuracies in the motion parameters collected. Accordingly, conventional techniques for determining motion of a vehicle have at least the above shortcomings. Similarly, global positioning system (GPS) data at any instant can be inaccurate or non-existent, e.g., in a tunnel. Hence, using only GPS data for determining real-time locations have at least the above shortcomings.

DETAILED DESCRIPTION

Figure 1:
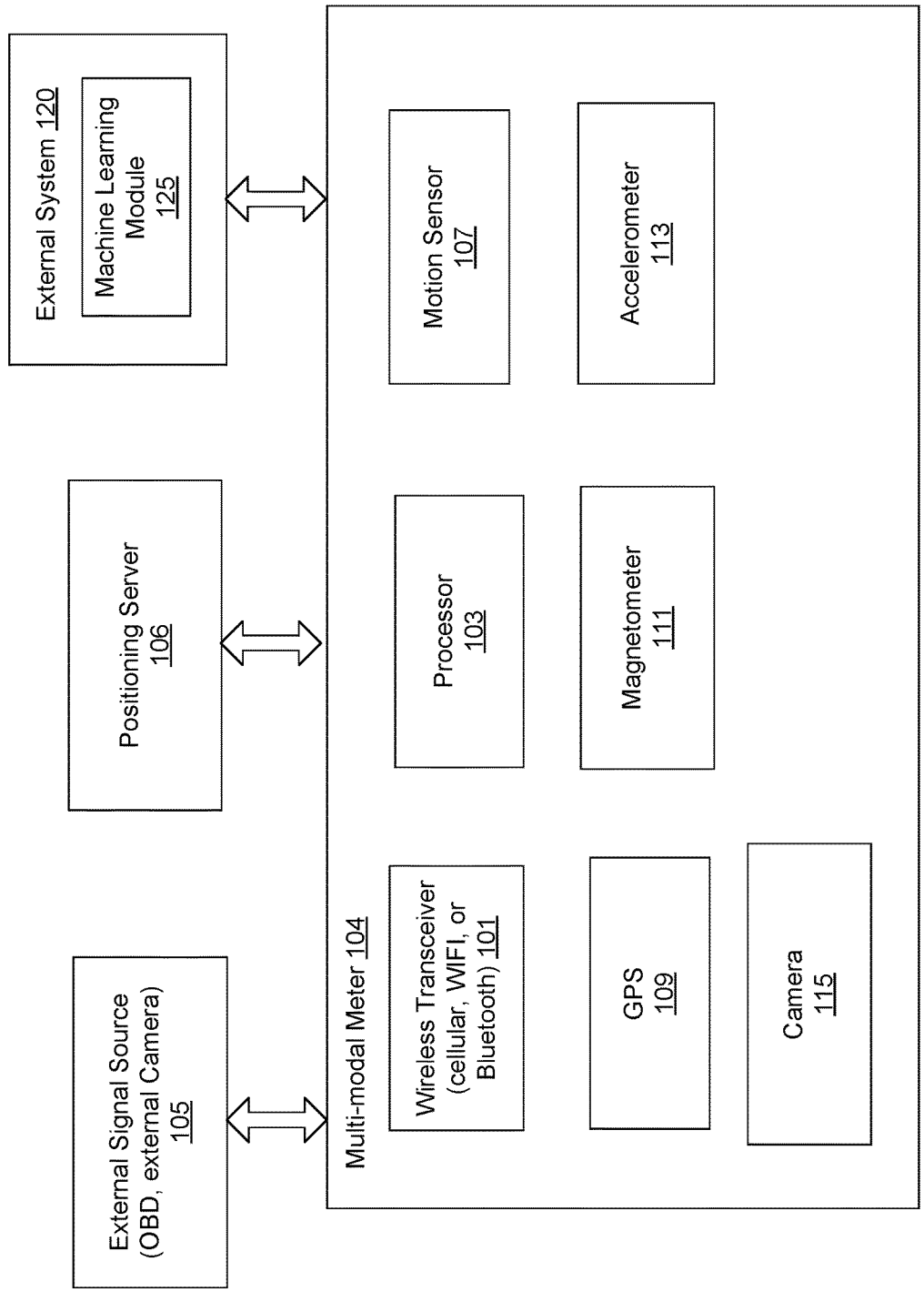
FIG. 1 is a high-level block diagram of the overall system environment for accurately determining motion parameters of a vehicle using a multi-modal meter, according to an embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

Configuration Overview

Methods, apparatus (or system), and computer readable storage media, allow a conventional computing device such as a mobile phone, laptop, or tablet to be used for determining motion parameters of a vehicle. In one exemplary embodiment, a digital computing device is configured as a multi-modal meter. The multi-modal meter uses a variety of signal sources (or data sources), both internal and external to the device, for computing motion parameters of the vehicle, for example, the distance, speed, and time travelled. Examples of internal signal sources such as global positioning system (GPS) and motion sensor, and examples of external signal sources include On-Board Diagnostics (OBD) or external GPS services.

The multi-modal meter dynamically switches the signal source used for determining the motion parameters of a vehicle, for example, switching the signal source multiple times as the vehicle travels from one location to another. An instance of a vehicle travelling from one location to another location is referred to herein as a ride. More specifically, a ride comprises a plurality of 3-dimensional points that may be represented as 3-dimensional vectors, each 3-D point associated with a timestamp representing the point in time when the vehicle reaches that point. Each 3-D point represents a spatial location through which the vehicle travels at a particular point in time. Each 3-dimensionl vector comprises values representing a latitude, a longitude, and an elevation. The multi-modal meter makes the determination dynamically based on one or more criteria: signal availability or strength, GPS accuracy, OBD accuracy, cross-referencing, integrity constraints, speed, and geographical areas. In an embodiment, the vehicle is a taxi that offers rides to users for remuneration.

In one embodiment, the multi-modal meter monitors the accuracy of a plurality of signal sources. The multi-modal meter dynamically selects a signal source from the plurality of signal sources during the ride based on the accuracy of the data received from various signal sources. For example, during a first portion of a ride, the multi-modal meter determines motion parameters based on a signal source S1. However, during a second portion of the ride, the multi-modal meter determines that the accuracy of the signal source S1 has fallen below an accuracy threshold value. As a result, the multi-modal meter switches to a different signal source S2 and determines motion parameters of the vehicle based on data received from signal source S2.

The features and advantages described in this summary and the following detailed description are not all-inclusive. Many additional features and advantages will be apparent to one of ordinary skill in the art in view of the drawings, specification, and claims hereof.

System Environment

FIG. 1 is a high-level block diagram of the overall system environment for accurately determining motion parameters of a vehicle using a multi-modal meter 104, according to an embodiment. The overall environment comprises the multi-modal meter 104, an external system 120, and various signal sources including, external GPS, OBD, and so on. Other embodiments may include more or fewer components than those indicated in FIG. 1.

The multi-modal meter 104 comprises a processor 103, one or more sensors 102 (including, for example, a magnetometer, an accelerometer, a motion sensor, and a global positioning system (GPS)), and a wireless transceiver (for receiving and/or sending cellular signal, or wifi signal, or communicating with a blue tooth device.) The multi-modal meter 104 interacts with one or more external sources (on-board diagnostics device, external GPS, and the like). The multi-modal meter 104 may also interact with a positioning server 106 that performs various calculations for the multi-modal meter 104, for example, to determine distance between coordinates in accordance with a map (based on streets, highways, etc. defined on the map.) The multi-modal meter 104 collects data from various sources as described below.

The multi-modal meter 104 collects information from GPS including geographical information (latitude, longitude), bearing (horizontal direction of travel), altitude, speed, and a measure of accuracy of said information (also referred to herein as an accuracy number for a signal source). The multi-modal meter 104 uses the native location services of the device (e.g., GOOGLE location services), for obtaining this GPS information. More specifically, the multi-modal meter 104 may use application programming interfaces (APIs) for a location service, for example, a fused location provider. The location service may use a variety of sources internally on the phone to provide GPS information, for example, GPS satellites (GPS, GLONASS, or other satellites), A-GPS (cellular triangulation), Wi-Fi access points. The multi-modal meter 104 subscribes to this API and whenever there is a GPS location the API returns that co-ordinate. This raw co-ordinate can be inaccurate depending on the environment. In an embodiment, the multi-modal meter 104 receives these values at a rate of 1 sample per 100 ms.

The multi-modal meter 104 calculates a distance travelled using the speed information (and the time delta between the current reading of motion parameters of the vehicle and the previous reading of the motion parameters of the vehicle) or by processing the raw co-ordinates to determine the distance, or by filtering the raw coordinates using filtering techniques, or by mapping said coordinates to roads to remove errors and then determining the distance.

The multi-modal meter 104 interfaces with various motion sensors on a mobile device, for example, a smartphone (depending on the manufacturer), tablet, a notebook, or a laptop, for example, Accelerometer, Gyroscope, magnetometer, camera, and GPS. Accordingly, embodiments use data collected from sensors of a mobile device with data collected from sources external to the mobile device to determine fare of a ride. The data collected from sources external to the mobile device includes GPS data and data from an OBD device connected to an on-board diagnostics port of the vehicle.

The multi-modal meter 104 obtains motion parameters of the vehicle from motion sensors, for example, (i) acceleration in m/s2 along x, y, z axes (ii) gravity in m/s2 along x, y, z axes (iii) rate of rotation around x, y, z axes.

The following descriptions correspond to examples of external data sources from which the multi-modal meter 104 may collect data describing a ride.

The multi-modal meter 104 receives the status of the various vehicle sub-systems from on-board diagnostics (OBD) system. A computing device is plugged into the OBD port and the multi-modal meter 104 requests data from the vehicle, using either a wireless (Bluetooth, WiFi, or other wireless connection) or a wired connection.

The multi-modal meter 104 collects various motion parameters from OBD, for example, vehicle speed, ABS speed, and tire pressure. In an embodiment, the multi-modal meter 104 receives values of speed at a rate of 1 sample per 100 ms. The multi-modal meter 104 determines the distance from the speed, for example, by performing numerical integration of the speed values. In an embodiment, the multi-modal meter 104 calculates distance by taking an average of current and previous speed samples and multiplying it by delta time between samples.

In an embodiment, the multi-modal meter 104 receives signal from an external GPS device via a smartphone. GPS accuracy on a smartphone depends on GPS chipset and placement of GPS antennas in the smartphone. The multi-modal meter 104 receives accurate GPS coordinates from the smartphone by connecting with an external GPS device with a higher quality GPS chipset and antenna.

In one embodiment, the multi-modal meter performs calibration of a signal source during normal operation of the vehicle. For example, if the multi-modal meter determines that the accuracy of a signal source S1 is consistently low, the multi-modal meter uses data from another signal source S2 (or set of sources S2, S3, S4) with high accuracy to calibrate the signal source S1. For example, the multi-modal meter uses a calibration factor to scale data received from the signal source S1 such that the scaled data has higher accuracy than the data generated by the signal source S1.

Computer Architecture

Figure 2:
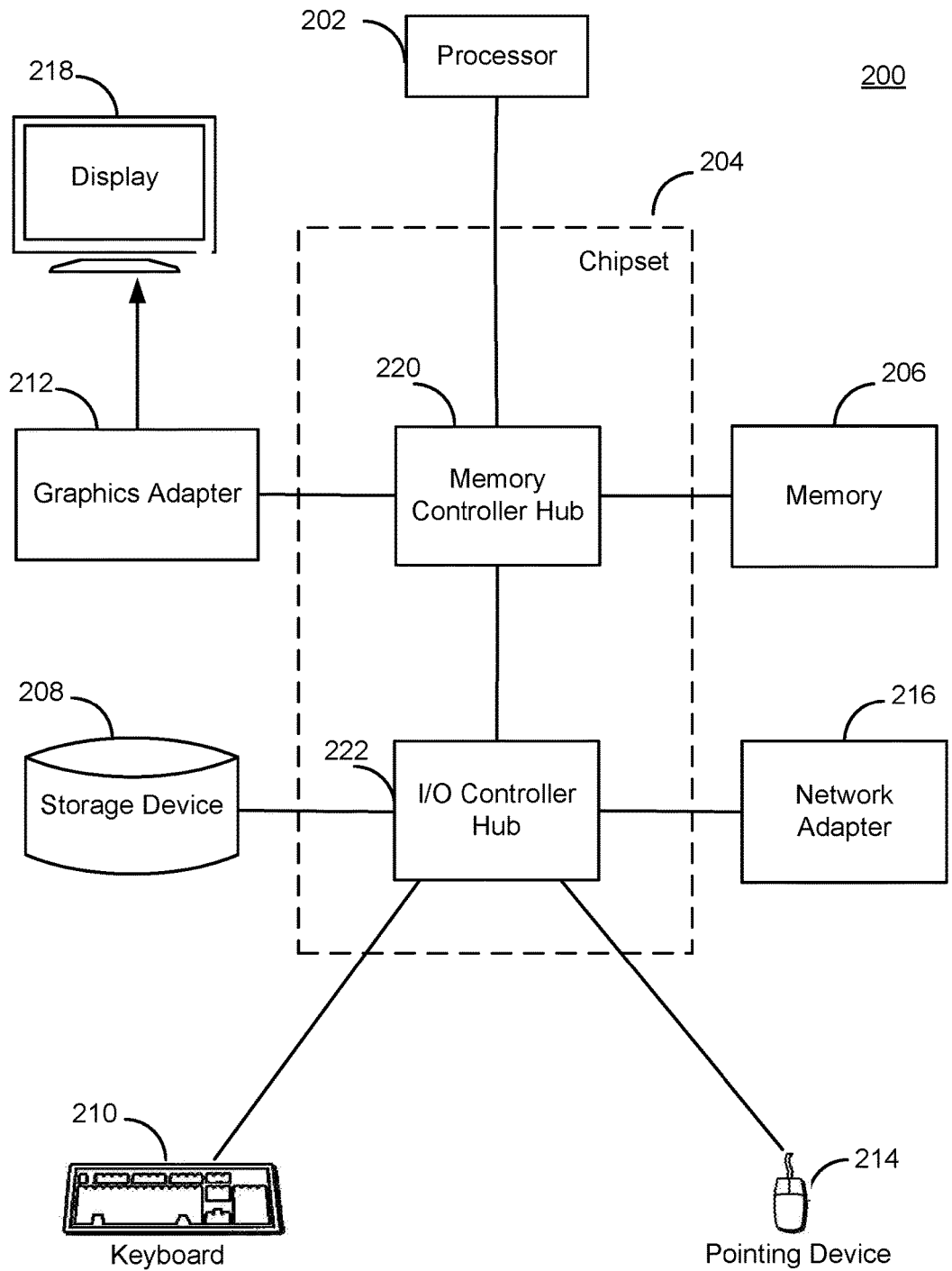
FIG. 2 is a high-level block diagram illustrating an example of a computer for use in the environment shown in FIG. 1 according to one embodiment of the present disclosure.

FIG. 2 is a high-level block diagram illustrating an example computer 200, such as the processor 103 shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used in FIG. 1 can vary depending upon the embodiment and requirements. For example, the computer system may be a mobile phone or a computing device.

Architectural Overview

Figure 3A:
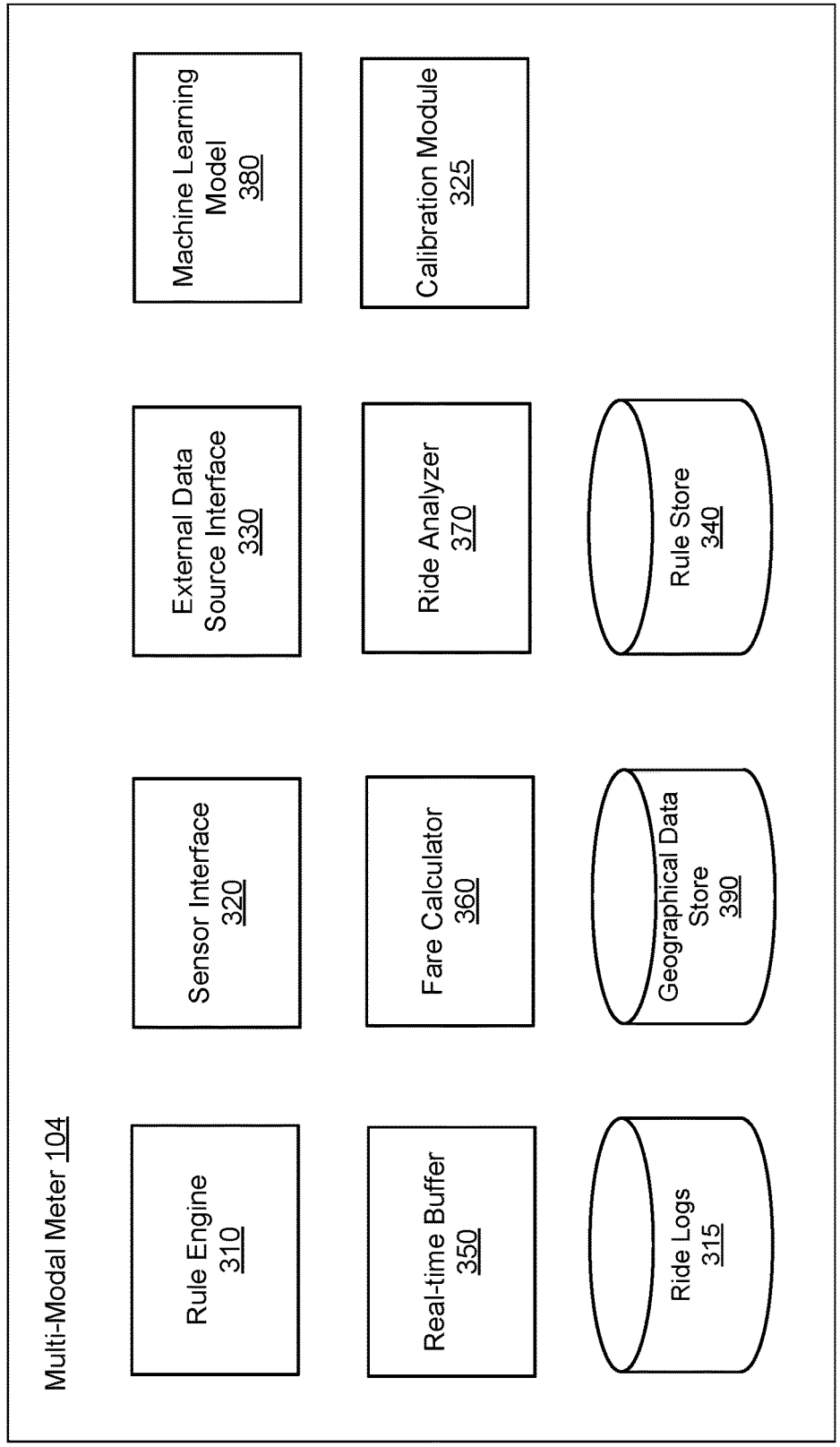
FIG. 3A is a high-level block diagram illustrating the various software modules of a multi-modal meter, according to one embodiment.

FIG. 3A is a high-level block diagram illustrating the various software modules of multi-modal meter, according to one embodiment. The computer system comprises modules including a rule engine 310, a sensor interface 320, an external data source interface 330, a rule store 340, a real-time buffer 350, a fare calculator 360, a ride analyzer 370, ride logs 315, a machine learning model 380, and a geographical data store 390. In an embodiment, the multi-modal meter 104 as shown in FIG. 3 interacts with a server that stores information used by the multi-modal meter 104 for example, rules for calculating fares or information describing characteristics of geographical regions.

The external data source interface 330 invokes APIs of external data sources to receive data from the external data sources.

The sensor interface 320 interfaces with various sensors, for example, accelerometer, motion sensor, and the like.

The real time buffer 350 collects data from various data sources for a ride and stores them in-memory (and/or on persistent storage).

The ride analyzer 370 collects various parameters describing the ride. These include the time that the ride starts and ends. The ride analyzer 370 also stores data collected for the ride from various sensors. These include various portions of rides and the speed, acceleration, time, distance measures for these portions.

The ride logs 315 stores historical data describing various rides performed by the vehicle. The ride logs 315 stores information describing various portions of a ride. The data stored in the ride logs is provided to the external system 120 for providing as training data set used by the machine learning module 125.

In an embodiment, the multi-modal meter 104 is configured to determine an accurate value of a fare of a ride offered by the vehicle. Every city can have its own fare rules. Examples of fare rules include: (i) flag drop charge (ii) cents per unit of metered distance increment (metered distance is defined as distance when speed is above certain speed threshold) (iii) cents per unit of wait time (wait time is defined as the time during which speed is below the speed threshold) (iv) speed threshold to determine wait time. In San Francisco, for example, there is a $3.50 flag drop rate, 55 cents for 0.2 miles of metered distance increments, 55 cents for 60 sec of wait time, and a wait time threshold is set at 12 miles per hour. The fare calculator 360 determines the fare based on data received from specific data sources. The fare calculator stores a mapping from various cities to the instructions for calculating fare for that city. In an embodiment, the fare calculator 360 identifies the city based on the GPS coordinates and executes the instructions for the fare calculation for the city based on the ride parameters.

The rule engine 310 processes various rules to determine the data sources used in a particular situation for determining the fares. In an embodiment, the rule engine 310 is configured such that a rule triggers if all input parameters required by the rule are available. In an embodiment, if multiple rules trigger at the same time based on the input parameters, the rule engine 310 selects a particular rule on priority of rules for execution. In another embodiment, the rule engine 310 executes actions of all rules that are triggered. In an embodiment, the rule engine 310 receives a vector as input that specifies data collected from various data sources. Certain rules are triggered in the rule engine 310 that dynamically select a specific data source based on various factors such as the accuracy of individual data sources. The rule engine 310 outputs a vector comprising data from the selected data source for use by the fare calculator 360.

The rule store 340 stores representations of rules processed by the rule engine 310. The rules may be represented using a proprietary syntax. Each rule comprises specification of one or more conditions that trigger execution of actions. In an embodiment, the rule store 340 is a cache of the device implementing the multi-modal meter 104. In these embodiments, the data of the rule store 340 is stored on a persistent storage in the server and is retrieved from the server by the multi-modal meter 104.

The geographical data store 390 stores information that describes specific geographical regions. In an embodiment, the geographical data store 390 is a cache of the device implementing the multi-modal meter 104. In these embodiments, the data of the geographical data store 390 is stored on a persistent storage in the server and is retrieved from the server by the multi-modal meter 104.

The geographical data store 390 stores information describing different geographical regions and the instructions to calculate fares corresponding to each geographical region. The geographical data store 390 maps geographical regions to specific data sources to be used when the vehicle is determined to be in that geographical region. This information may be based on expert opinions or based on historical data collected by the multi-modal meter 104. For example, if the multi-modal meter 104 determines based on historical data that a particular geographical region (say San Francisco downtown) has consistently bad GPS signal, the multi-modal meter 104 associates this geographical region with a data source other than GPS (for example, OBD data source.) Accordingly, if the vehicle is determined to be within the geographical region, the GPS signal is ignored and the data from OBD data source is used. The geographical data store 390 identifies specific geographical regions using one or more polygons that mark the boundary of the geographical region.

The machine learning model 380 is trained by the machine learning module 125 of the external system 120. The multi-modal meter 104 determines metadata used by the rule engine 310 based on the machine learning model 380. The metadata determined based on the machine learning model 380 for a particular set of ride parameters that are input to the machine learning model 380. Examples of metadata determined based on the machine learning model 380 include accuracy threshold values for various signal sources and rule precedence used by the rule engine 310 for selecting a particular rule if multiple rules are eligible for execution at the same time.

Figure 3B:
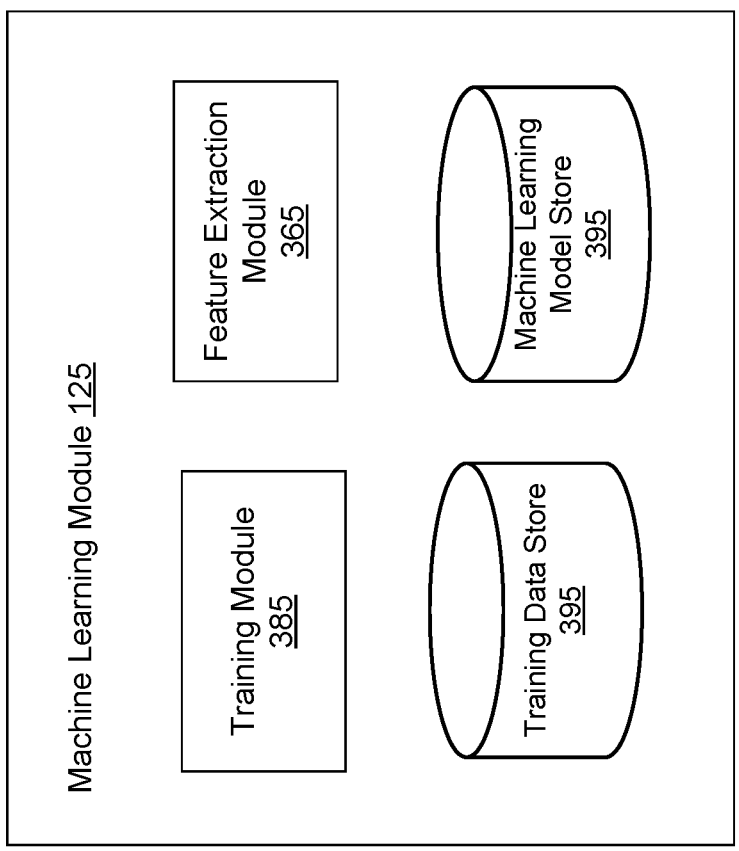
FIG. 3B shows the architecture of a machine learning module for predicting accuracy thresholds for signal sources used for determining motion parameters of a vehicle, according to an embodiment.

FIG. 3B shows the architecture of the machine learning module for predicting accuracy thresholds for signal sources used for determining motion parameters of a vehicle, according to an embodiment. The machine learning module 125 comprises a training module 385, a training data store 395, and a machine learning model store 395. In other embodiments, the machine learning module 125 includes more or fewer modules than those indicated in FIG. 3B.

The machine learning module 125 determines accuracy thresholds for various signal sources using machine learning techniques, for example, unsupervised learning or supervised learning. In an embodiment, an expert reviews logs of rides and creates a training data set that is stored in the training data store 395.

The feature extraction module 365 extracts various features of a given ride context, for example, the time of day, the day of the week, geographical location such as city, and street, and so on.

The training module 330, illustrated in FIG. 3, trains the machine learning model 380 using training data set that may be provided by experts. Dimensionality reduction (e.g., via linear discriminant analysis, principle component analysis, etc.) may be used to reduce the amount of data in the feature vector to a smaller, more representative core set of features. The training set for the machine learning models includes positive and negative examples of accuracy threshold values for different contexts of rides of vehicles. In supervised training, example contexts of rides and corresponding accuracy threshold values validated by experts are provided as training dataset. The training process provides machine learning models that can then be used as machine learning model 380 to determine accuracy threshold values for contexts of ride that have not been encountered by the machine learning model 380 before.

Machine learning techniques used include support vector machines (SVMs), neural net, logistic regression, naïve Bayes, memory-based learning, random forests, bagged trees, decision trees, boosted trees, boosted stumps, etc. The trained machine learning model 380 is used to determine accuracy threshold values based on the same features being extracted from new ride contexts, as used for training the machine learning model. Some embodiments of training module 330 use unsupervised machine learning that provides training data without labeled responses. Examples of unsupervised machine learning techniques use clustering, for example, k-means clustering, hierarchical clustering, and so on.

Rules for Determining Fares

A rule specifies a condition and one or more actions. The actions are executed if the condition evaluates to true. The condition is an expression based on one or more data values received from the data sources. For example, a condition specified in a rule may evaluate to true when a measure of accuracy of a data source is below a threshold value. The actions specified by the rule may select a particular data source for certain data parameters used for the fare calculation. Rules have precedence, and are executed in the precedence order. The rule precedence order may be determined based on the machine learning model 380.

The multi-modal meter dynamically selects a signal source based on availability or accessibility of data from the signal source. The multi-modal meter 104 uses GPS services from any third party, for example Google Location Services. The multi-modal meter 104 subscribes to a third party location services via API and every time there is a GPS co-ordinate available, the third party service provides the multi-modal meter 104 with that raw co-ordinate. A third party service may use fused location services (a combination of GPS satellites, A-GPS, Wi-Fi APs) to get those raw co-ordinates. The multi-modal meter 104 can detect unavailability of GPS, for example, if the GPS co-ordinates received are zero.

OBD hardware may be connected to the multi-modal meter 104 via BT (BLUETOOTH). The multi-modal meter 104 maintains an active BT connection, and can detect when the connection is lost. For example, The Android OS BT service will raise an error or disconnect event when a connection loss is detected. Following is a specification of an example rule.

Condition: source[0]='GPS' source[1]='OBD'
If (state of source[0])='unavailable' then use source[1]
2. GPS accuracy: A third party GPS service may return an accuracy number as one of the values. The accuracy number may be defined as a radius of 68% confidence (1 sigma). Typically, in clear sky conditions, an accuracy number of 3 meters is achievable. But, the accuracy varies from device to device because of differences in GPS chipsets and antenna circuits. Following is a specification of an example rule:

Condition: source[0]='GPS' source[1]'OBD'
If (accuracy number of source[0])>Desired_Accuracy_Threshold then use source[1] In one embodiment, Desired_Accuracy_Threshold is a global constant value. In other embodiments, Desired_Accuracy_Threshold is a value predicted by a machine learning model. The machine learning model determines the value of Desired_Accuracy_Threshold based on various features describing a context of the ride, for example, geographical location in which the ride occurred, the time of day during which the ride occurred, the make and model of the vehicle, and so on.

In an embodiment, the system shown in FIG. 3 interacts with a server comprising a machine learning module 125. The machine learning module 125 uses machine learning to generate machine learning models for generating metadata used by the rule engine 310. The multi-modal meter 104 receives the machine learning model generated by the machine learning module 125 from the server.

The machine learning module 125 trains a machine learning model, for example, based on supervised learning. An expert reviews logs of rides and creates a training set. For ex: 100 vehicle rides at 5 pm along market street in SF. By looking at the pattern of data, an expert can determine which signal source is accurate in a given ride context. In an embodiment, the machine learning model 380 uses the following features: time of day, day of week, city, and gps-coordinates (either raw or filtered), make and model of the device, make and model of the vehicle.

In an embodiment, the machine learning module may also use unsupervised machine learning. For example, it may use these signals to determine whether and when any of the following are accurate: distance computed by GPS data, distance computed by OBD, distance computed by accelerometer, distance computed by cameras, GPS accuracy.

An OBD device uses speed information provided by the vehicle's internal bus system which carries a variety of information about the vehicle, including its speed. Typically, this speed data may have errors due to wear and the tear, temperature, and pressure of the vehicle's tires, or due to transmission issues, or due to other electrical or mechanical issues with the vehicle. The device may even present accurate values, but lack high precision. If the precision is low, the error on a percentage scale is higher at lower speeds and lower at higher speeds. Accordingly, the multi-modal meter 104 checks if the speed of the vehicle is below a predefined threshold for the make and model of that vehicle. If the multi-modal meter 104 determines that the speed of the vehicle is below the predefined threshold, the multi-modal meter 104 assumes that the accuracy of a data source (in this case, the OBD data source) is low and either uses another data source (for example, GPS) or uses error-correction rules which are either pre-defined or learnt.

Once in a tunnel, the multi-modal meter 104 obtains GPS co-ordinates with questionable data, but typically with a low accuracy. The multi-modal meter 104 may receive low accuracy GPS signals or zero GPS signals in areas other than a tunnel. Accordingly, whenever the GPS signal accuracy is low (the accuracy number is greater than a threshold) or zero, the multi-modal meter 104 uses a data source other than GPS for determining ride parameters.

Some geographical areas (such as downtown NYC) are received as polygon co-ordinates by the multi-modal meter 104 from the server. The multi-modal meter 104 detects if the GPS co-ordinate falls in the polygon or not. The multi-modal meter 104 determines a source of particular data based on whether the location based on GPS coordinate lies in particular polygons corresponding to predetermined geographical areas. For example, certain locations are known to have bad GPS signals. Accordingly it is inefficient for the multi-modal meter 104 to keep calculating the accuracy of the data sources and repeatedly selecting the same data source.

Speed of the vehicle may also be used in a manner similar to that described above to determine the most accurate motion parameters.

Overall Process

Figure 4:
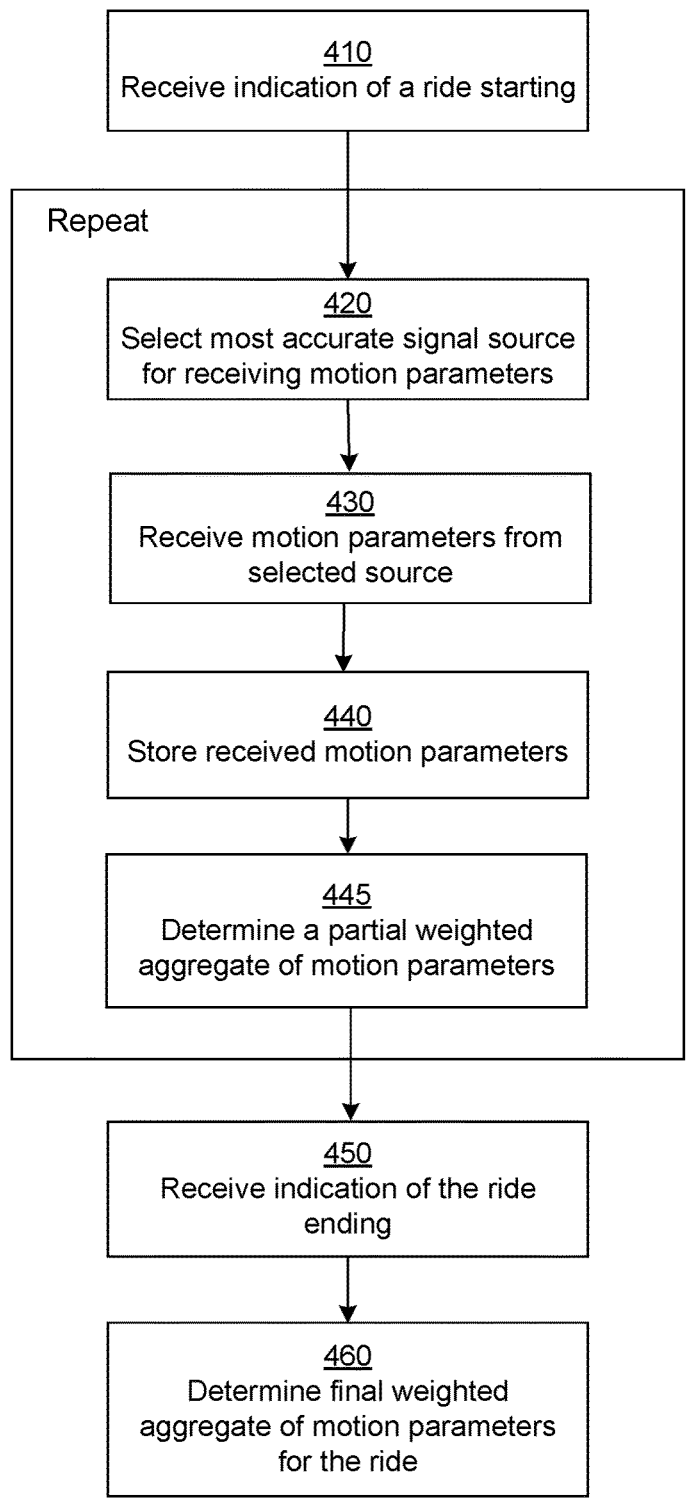
FIG. 4 shows a flowchart that illustrates the overall process for determining fare of a ride according to an embodiment.

FIG. 4 shows a flowchart that illustrates the overall process for determining fare of a ride according to an embodiment. The ride analyzer 370 receives 410 an indication of a ride starting. In an embodiment, the indication is received from a user interface based on input provided be a user.

The ride analyzer 370 collects data parameters for the ride by repeatedly performing the following steps 420, 430, 440, and 445. The ride analyzer 370 selects a signal source for receiving the ride parameters, for example, distance, speed, or location. The ride analyzer 370 may dynamically change the signal source from one portion of the ride to another portion of the ride. In an embodiment, the selection of the data source is performed as a result of an action of a rule executed by the rule engine 310. The ride analyzer 370 receives 430 the ride parameters from the selected data source. The ride analyzer 370 stores 440 the received ride parameters. The ride analyzer 370 determines 445 a partial weighted aggregate of the motion parameters of the ride travelled so far. In an embodiment, the fare calculator 360 determines a partial fare for the ride so far, based on the partial weighted aggregate of the motion parameters. The fare calculator 360 sends the value of the partial fare for display.

The ride analyzer 370 may store the ride parameters in the real time buffer 350. Additionally the ride analyzer 370 may also store the ride parameters in a persistent store (not shown in FIG. 3) to allow the ride parameters to be analyzed offline at a later stage, for example, by a machine learning module.

In an embodiment, the steps 420, 430, 440, and 445 are repeated on a regular basis at a fixed periodicity. In other embodiments, the steps 420, 430, 440, and 445 are executed when the ride analyzer 370 detects a change in a specific parameter value, for example, a change in direction in which the vehicle is moving, a change in speed of the vehicle causing the speed value to cross a threshold value, and so on.

The ride analyzer 370 receives 450 an indication of the end of the ride. In an embodiment, the indication is received from a user interface based on input provided by a user. The ride analyzer 370 determines 460 a final weighted aggregate of the motion parameters of the entire ride. In an embodiment, the fare calculator 360 determines the final fare for the entire ride based on the final weighted aggregate of the motion parameters. The fare calculator 360 sends the value of the final fare for display.

In an embodiment, the fare calculator 360 uses the instructions for fare calculation based on a geographical location of the vehicle which is received from the GPS.

Example Scenarios

Figure 5:
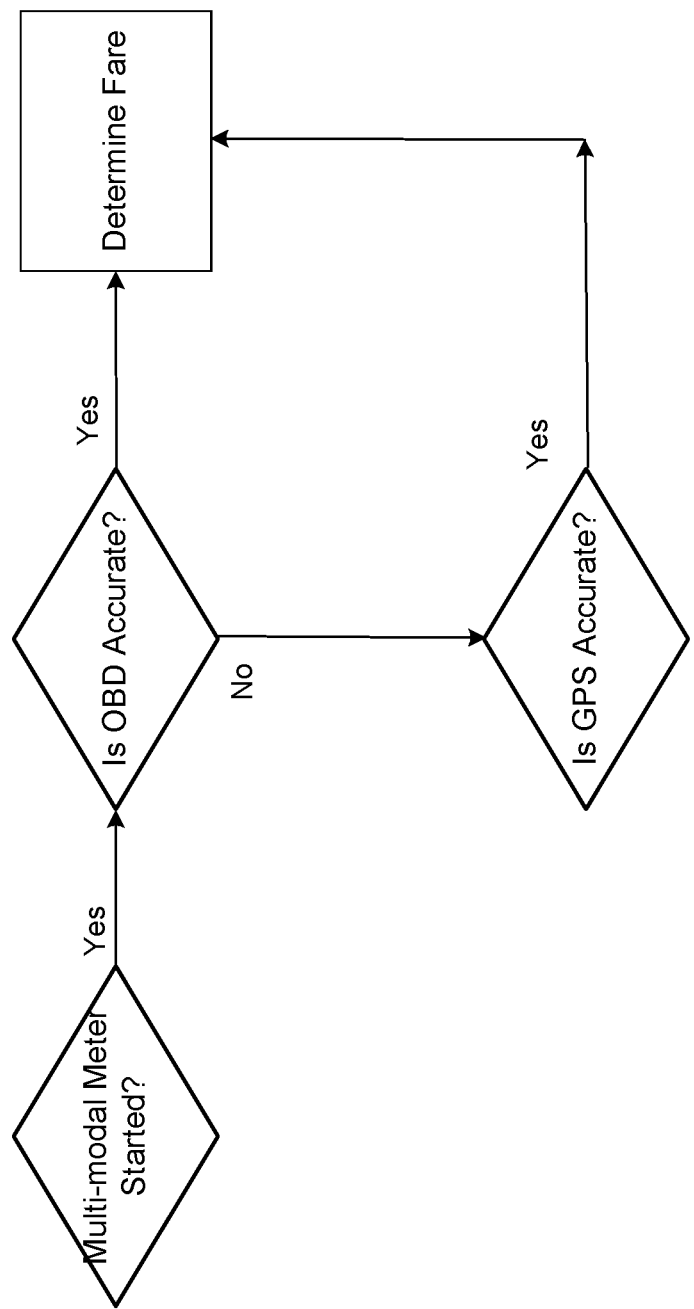
FIG. 5 is a flow diagram illustrating a first example scenario for determining fare according to an embodiment.

FIG. 5 is a flow diagram illustrating a first example scenario for determining fare according to an embodiment. According to this scenario, the vehicle is in a major city (for example, San Francisco) and stuck in traffic on a highway. Also, in this scenario the multi-modal meter 104 receives a strong GPS signal. The speed of the traffic is very slow, causing the vehicle to move at a speed below a predetermined threshold. In this situation, the following rules trigger: (i) Rule 1: OBD speed threshold set at 12 mph (accordingly if vehicle speed is above speed threshold of 12 mph, OBD is used as data source otherwise it is not used as a data source). (ii) Rule 2: GPS accuracy number set at 20 feet (accordingly, if the GPS accuracy number is at most 20 feet, then GPS is used as the data source). If the vehicle detects that the vehicle speed is 5 miles per hour and GPS accuracy number is at 10 feet (less than 20), both these rules trigger. As a result, the multi-modal meter 104 uses the GPS signal for measuring the ride parameters for this portion of the ride.

Figure 6:
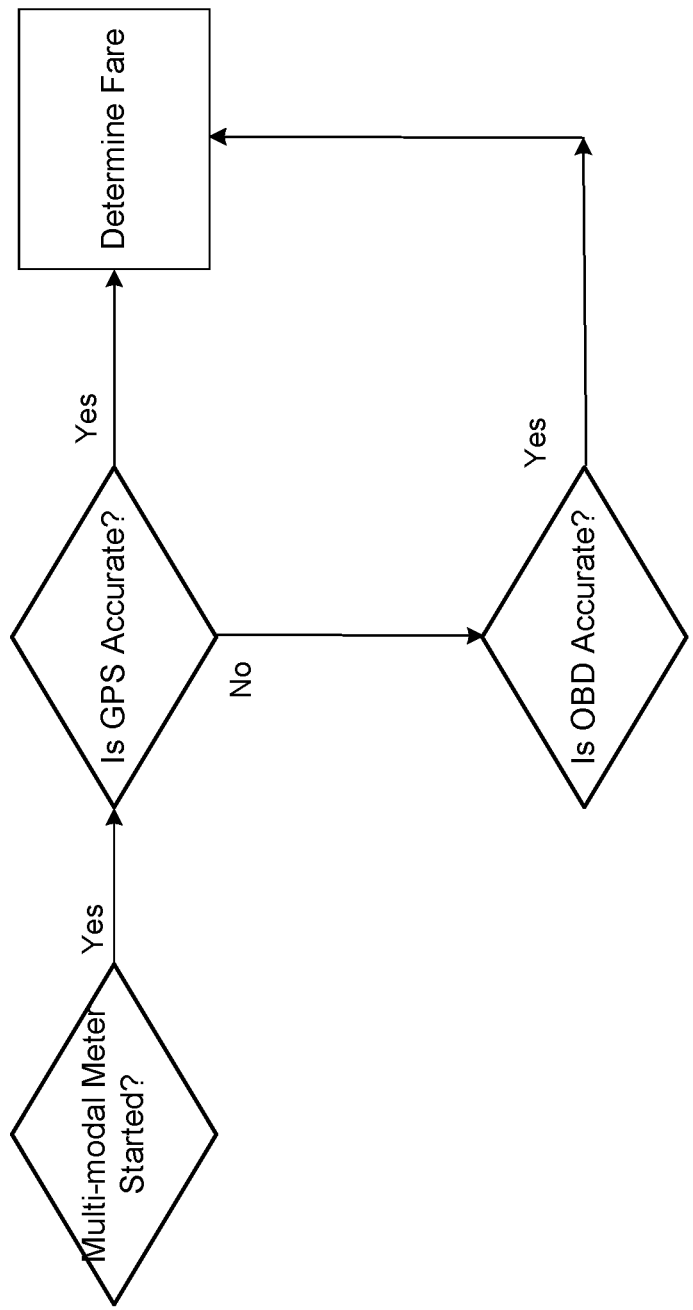
FIG. 6 is a flow diagram illustrating a second example scenario for determining fare according to an embodiment.

FIG. 6 is a flow diagram illustrating a second example scenario for determining fare according to an embodiment. According to this scenario, the vehicle is in a place with poor GPS signal (with low GPS accuracy) but vehicle speed is high. The same two rules as described in the first scenario (FIG. 5) are applicable. However in this situation, due to low GPS accuracy, the GPS signal is not used. Furthermore, because of high vehicle speed resulting in high OBD accuracy, OBD signal is used. As a result, the multi-modal meter 104 uses the OBD signal for measuring the ride parameters for this portion of the ride.

Figure 7:
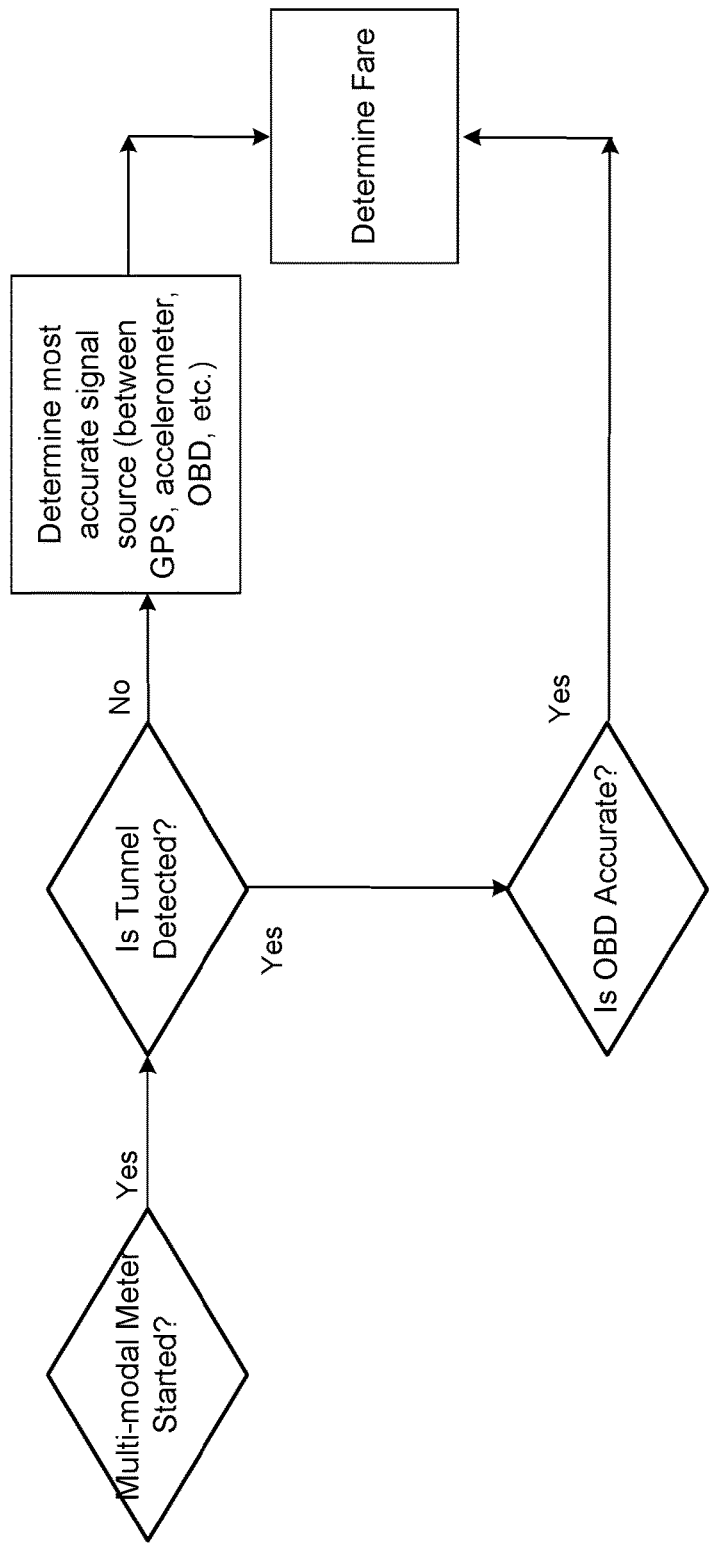
FIG. 7 is a flow diagram illustrating a third example scenario for determining fare according to an embodiment.

FIG. 7 is a flow diagram illustrating a third example scenario for determining fare according to an embodiment. If no tunnel is detected, the multi-modal meter determines the most accurate signal source, for example, the most accurate signal source between GPS, accelerometer, OBD, and so on and uses the most accurate signal source to determine the fare. In this scenario the vehicle enters and exits a tunnel travelling at a fixed speed (for example, 50 miles per hour). The rules triggered in this scenario are: i) Tunnel detected when GPS co-ordinates are determined to be within a polygon describing the tunnel or based on the fact that GPS signal is zero once the vehicle enters the tunnel. ii) OBD speed threshold is set at 0 mph. In this situation, the multi-modal meter 104 determines that the GPS signal cannot be used either based on the fact that the vehicle is in the tunnel or based on the fact that GPS signal is low or zero in the tunnel. The multi-modal meter 104 further detects that the speed of the vehicle is above the speed threshold of 0 miles associated with the OBD data source indicating that the OBD accuracy is acceptable. Accordingly, the multi-modal meter 104 uses the OBD signal. This scenario is also applicable to other geographical locations where the GPS signal is weak or is determined to be inaccurate (and the OBD accuracy is acceptable).

Figure 8:
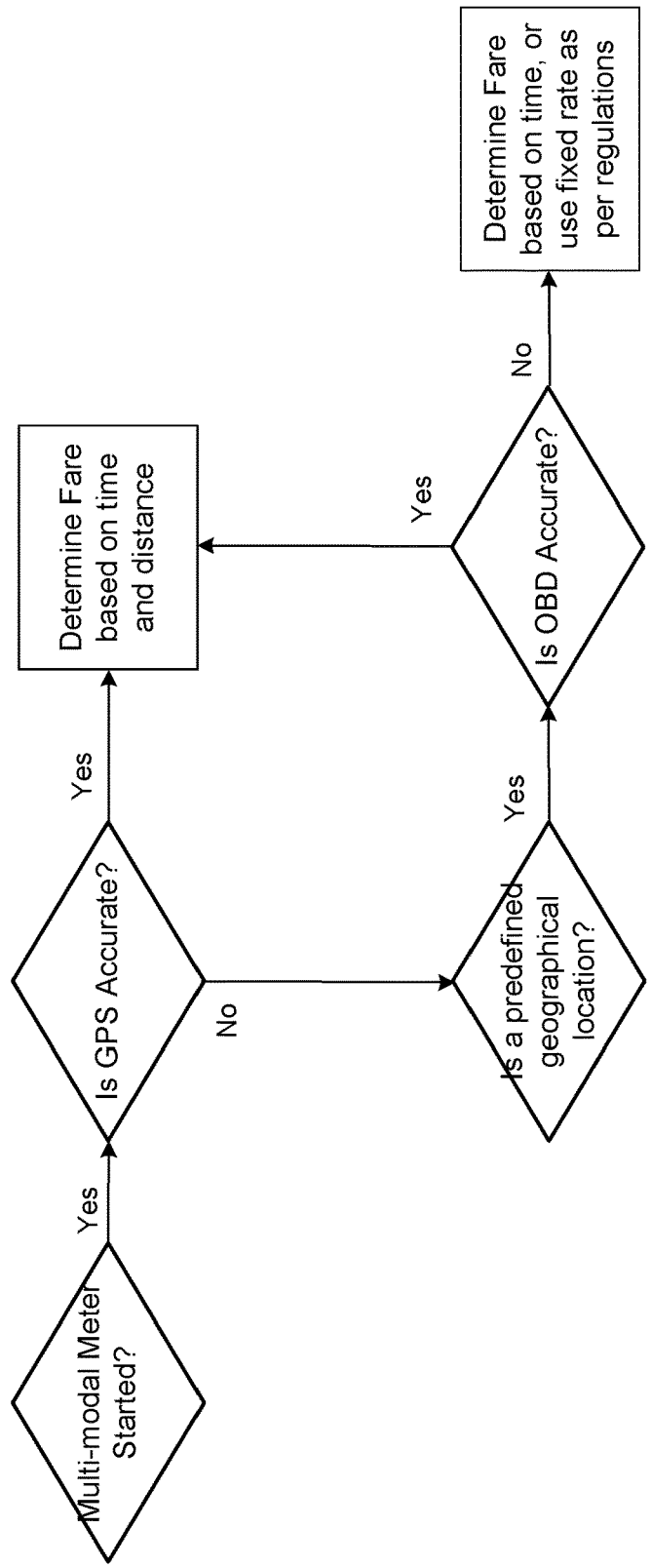
FIG. 8 is a flow diagram illustrating a fourth example scenario for determining fare according to an embodiment.

FIG. 8 is a flow diagram illustrating a fourth example scenario for determining fare according to an embodiment. In this scenario, the vehicle is entering from a highway having a clear line-of-light GPS signal and is driving into the downtown of a major city (e.g., San Francisco) where there are tall buildings obstructing GPS line-of-sight. Once the vehicle enters the downtown area, the rules triggered are as follows: (i) Geographical constraint on downtown as a multi-polygon sent to the multi-modal meter 104 device as a polygon by the server, (ii) GPS accuracy threshold set at 20 feet (ft), but the GPS accuracy number is 100 feet. In this situation, the multi-modal meter 104 determines that OBD should be used as the data source.

In an embodiment, if the multi-modal meter 104 determines for a portion of ride that the accuracy of both GPS and OBD is below an acceptable level, the multi-modal meter 104 uses default mechanisms to determine the portion of fare based on this portion of ride. For example, the multi-modal meter 104 may determine fare for this portion of ride based on a fixed rate and the time taken by this portion of the ride. Alternatively, the multi-modal meter 104 may determine fare for this portion of ride based on the speed obtained from the accelerometer and time from the device itself.

Machine Learning Model

In some embodiments, a multi-modal meter 104 uses a machine learning model 380 for determining various parameters used for configuring the rule engine 310. The multi-modal meter 104 uses the machine learning model 380 for generating metadata used by the rule engine 310. An example of metadata generated using the machine learning model 380 is an accuracy threshold value used by a rule configured to select one or more signal sources from a plurality of signal sources for determining the most accurate motion parameters describing a ride of a vehicle. Another example of metadata generated using the machine learning model 380 is metadata describing rule precedence for selecting a rule for execution if multiple rules are determined by the rule engine to be eligible for execution at the same time.

Figure 9:
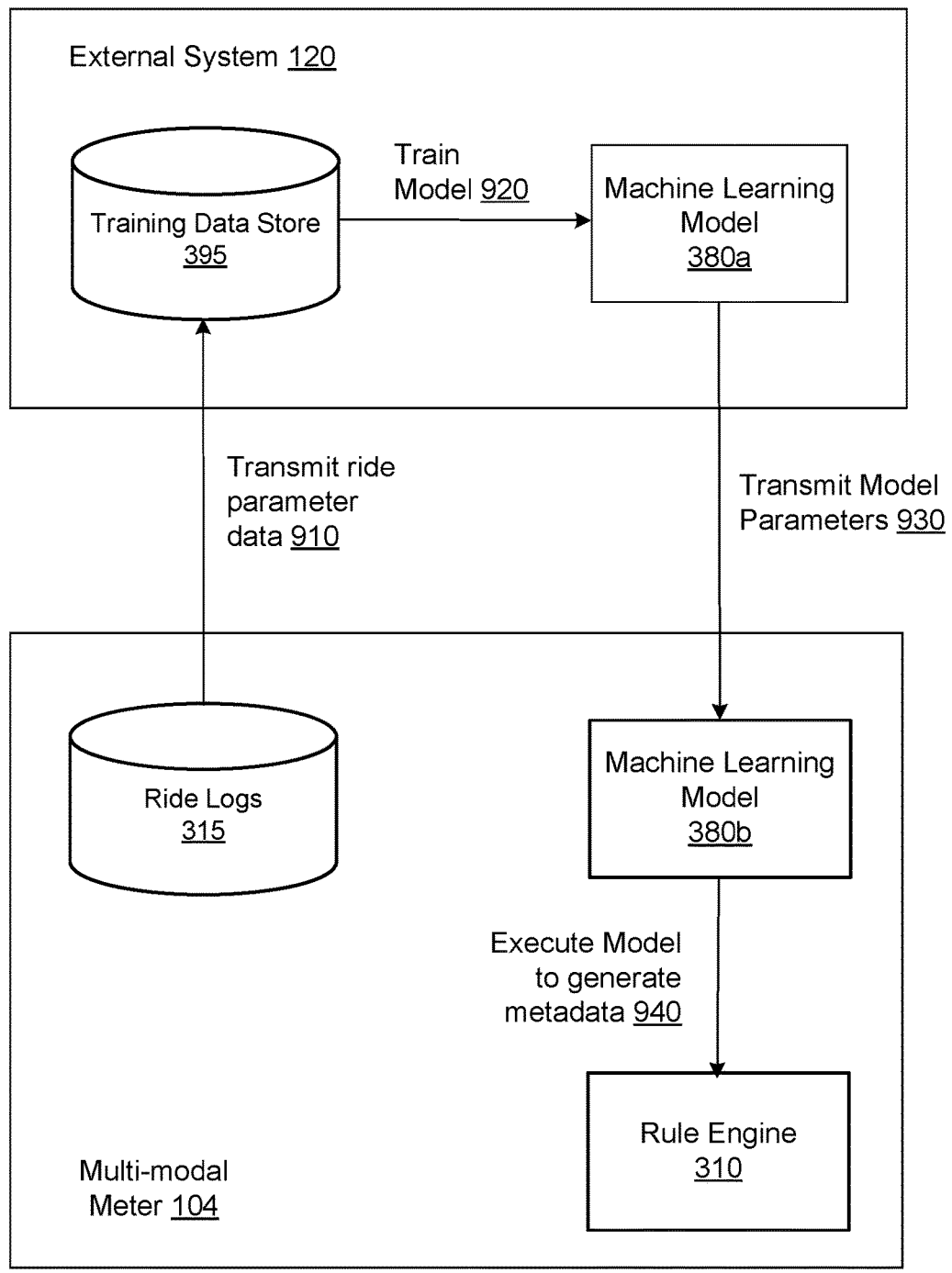
FIG. 9 illustrates the interaction between an external system for training a machine learning model and a multi-modal meter receiving and executing the machine learning model, according to an embodiment.

FIG. 9 illustrates the interaction between an external system training a machine learning model and a multi-modal meter receiving and executing the machine learning model, according to an embodiment. The multi-modal meter 104 transmits 910 data stored in ride logs 315 to the external system 120 for use in training the machine learning model 380. The data stored in the ride logs 315 comprises ride parameters of various portions of rides traversed by a vehicle. The data further comprises decisions made by the multi-modal meters 104 of various vehicles for selecting appropriate signal sources as accurate signal sources in various ride contexts.

The external system 120 receives data stored in ride logs of various vehicles and stores the data in the training data store 395. In an embodiment, the external system 120 provides the data stored in the training data store 395 for review by an expert. The external system 120 receives information from experts describing whether specific signal sources are accurate or inaccurate in a given ride context. The external system 120 trains 920 the machine learning model 380a based on the training data set stored in the training data store 395.

The external system 120 transmits 930 parameters describing the trained machine learning model 380a to the multi-modal meter 380. The multi-modal meter 104 receives the machine learning model 380a and stores the received machine learning model as the machine learning model 380b. The multi-modal meter 104 executes 940 the machine learning model 380b to generate metadata that is used by the rule engine 310. The metadata generated includes accuracy threshold values used for determining whether a signal source is accurate in a given context, and information describing precedence or rules executed by the rule engine 310. The multi-modal meter 104 executes the rule engine 310 to dynamically select the most accurate motion parameters based on data received from various signal sources during various portions of a ride.

Figure 10:
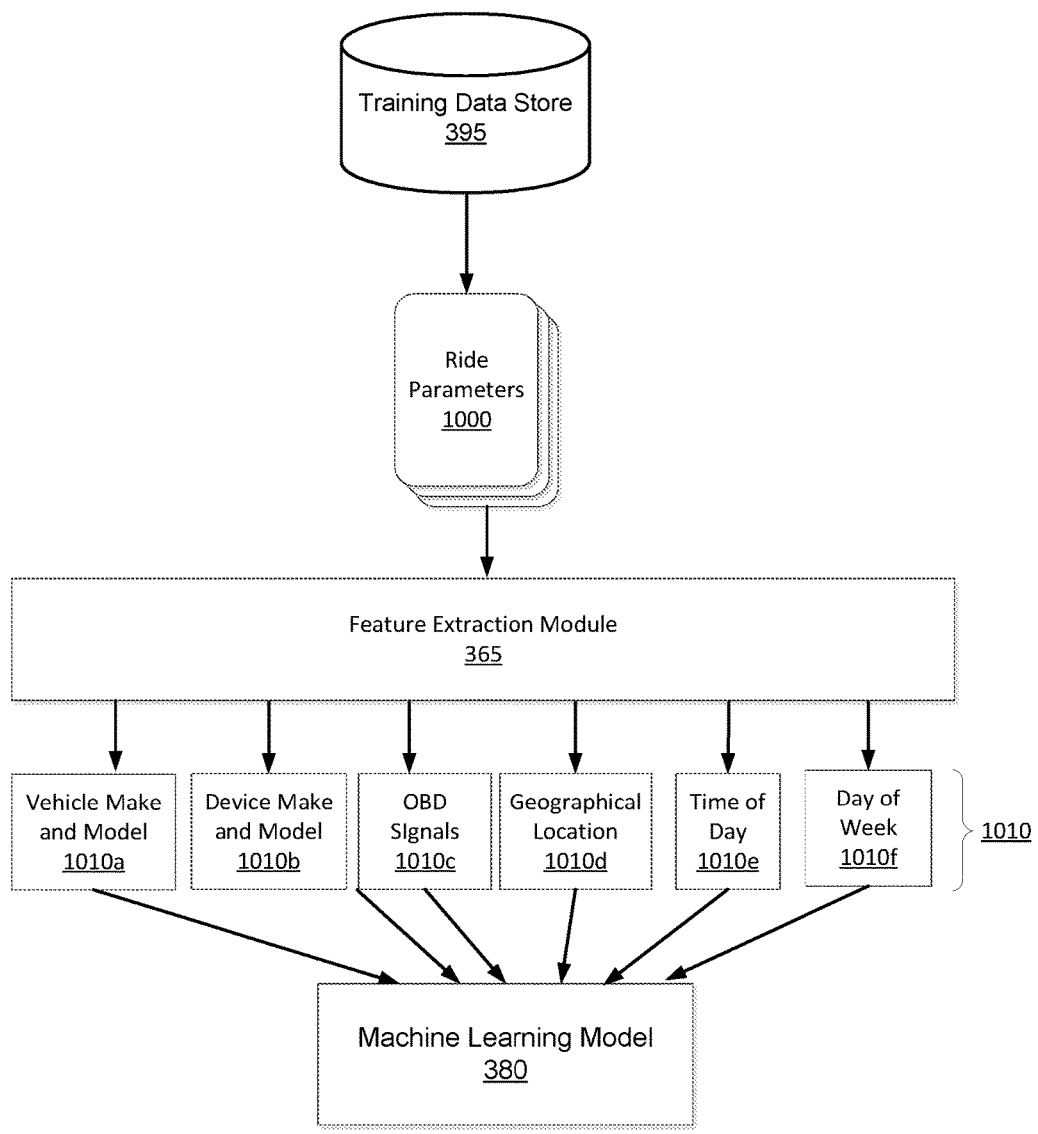
FIG. 10 illustrates the process and interaction of various modules for training a machine learning model for determining metadata for use by a rule engine of a multi-modal meter, according to an embodiment.

FIG. 10 illustrates the process and interaction of various modules for training a machine learning model for determining metadata for use by a rule engine of a multi-modal meter, according to an embodiment.

The external system 120 includes a training data store 395 that stores various examples of rides of vehicles and signal sources used in various contexts. A context of a ride includes various parameters associated with a portion of a ride, for example, the time of the day during which that portion of the ride was travelled, the geographical location of that portion of the ride, and so on. The training module 385 extracts various ride parameters 1000 from the training data store 395. The feature extraction module 365 extracts various features 1010 describing each ride context 1000.

Examples of features extracted from ride parameters determined during a portion of ride include make and model 1010a of vehicle, make and model 1010b of various devices used as signal sources, vehicle parameters 1010c received from OBD (for example, tire pressure), geographical location 1010d of the vehicle, time of day 1010e when the portion of ride was being travelled, day of the week 1010f when this portion of ride was travelled, version of a software executing on the devices used as signal sources, speed/velocity/acceleration of the vehicle during this portion of the ride, and so on.

The training module 385 trains the machine learning model 380 using the features extracted from the various ride parameters. The training process may be unsupervised or supervised. In case of supervised training, an expert identifies positive examples of accuracy threshold values that are correct and negative examples of accuracy threshold values that are incorrect. The external system 120 stores the parameters describing the trained machine learning model 380 in the machine learning model store 395. The external system 120 sends the parameters describing the trained machine learning model 380 to the multi-modal meter 104.

Figure 11:
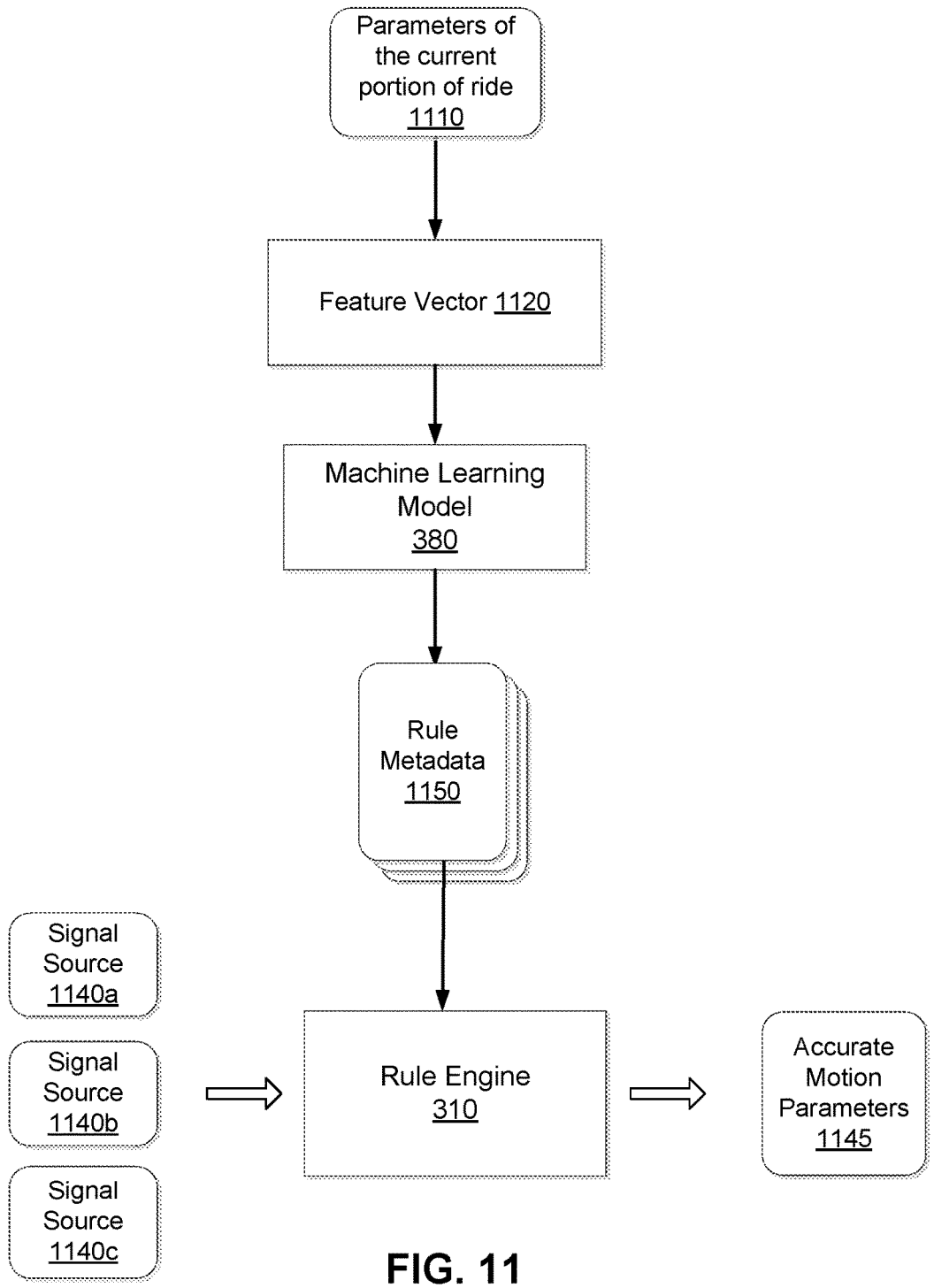
FIG. 11 illustrates the process and interaction of various modules that execute a machine learning model for determining metadata for use by a rule engine of a multi-modal meter, according to an embodiment.

FIG. 11 illustrates the process and interaction of various modules that execute a machine learning model for determining metadata for use by a rule engine of a multi-modal meter, according to an embodiment.

The process illustrated in FIG. 11 is executed by the multi-modal meter 104. In an embodiment, the multi-modal meter 104 invokes the process illustrated in FIG. 11 when the multi-modal meter 104 determines a change in ride context. For example, if the vehicle moves from one geographical region to another geographical region, the multi-modal meter 104 determines a change of ride context and invokes the process illustrated in FIG. 11.

The multi-modal meter 104 determines the ride parameters 1110 for a portion of the present ride of the vehicle. The feature extraction module 365 extracts a feature vector 1120 that includes various features extracted from the ride context 1110. The machine learning model 380 receives the feature vector 1120 as input and generates scores used for determining metadata 1050 used for configuring the rule engine 310. The rule engine 310 receives and incorporates the generated metadata. For example, the rule engine 310 updates the rules to reflect any accuracy threshold values specified in the generated metadata.

The rule engine 310 receives data from various signal sources 1140a, 1140b, 1140c. The rule engine 310 executes various rules from the rule store 340 to determine the most accurate motion parameters 1145 describing the portion of the ride. The ride analyzer 370 uses the accurate motion parameters 1145 for analyzing the ride.

Alternative Embodiments

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining fare of ride in a vehicle. Thus, while particular embodiments and applications have been illustrated and described, it is to be understood that the disclosed embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. An apparatus, comprising:
  a processor;
  one or more local signal sources;
  an interface for communicating with external signal sources; and
  a non-transitory computer readable storage medium comprising stored instructions, the instructions when executed cause the processor to:
    collect data from a plurality of signal sources, the data comprising motion parameters for a portion of a ride of a vehicle, wherein the plurality of signal sources comprises one or more of local signal sources or external signal sources;
    for each of a plurality of portions of the ride:
      evaluate accuracy of each signal source from the plurality of signal sources by executing a machine learning model on at least a portion of the motion parameters for the portion of the ride to generate metadata for the portion of the ride, wherein the metadata comprises an accuracy threshold value for each signal source from the plurality of signal sources for the portion of the ride;
      execute a rule engine to dynamically select one or more signal sources based on the accuracy threshold value of the corresponding signal sources for the portion of the ride;
      determine a set of accurate motion parameters describing the portion of the ride based on data received from the one or more selected signal sources, the set of accurate motion parameters comprising one or more of: speed of the vehicle, time duration of the portion of ride, acceleration of the vehicle, and location of the vehicle.

2. The apparatus of claim 1, further comprising stored instructions that when executed cause the processor to:
  dynamically select a signal source for the portion of the ride based on availability of data from the signal source.

3. The apparatus of claim 1, further comprising stored instructions that when executed cause the processor to:
  determine a measure of accuracy of data received from one or more signal sources; and
  select the signal source for the portion of ride based on the measures of accuracy of the one or more signal sources.

4. The apparatus of claim 1, further comprising stored instructions that when executed cause the processor to:
  evaluate an expression based on ride parameters describing the portion of the ride.

5. The apparatus of claim 4, wherein a ride parameter represents one or more of:
  make and model of the vehicle,
  make and model of the apparatus,
  location of the vehicle,
  acceleration of the vehicle,
  speed of the vehicle,
  the time of day,
  a day of the week, or
  time of at least a portion of the ride.

6. The apparatus of claim 1, further comprising stored instructions that when executed cause the processor to:
  determine that the accuracy of a first signal source is below a threshold value;

identify a second signal source having a high measure of accuracy compared to the first signal source; and
calibrate the first signal source based on the data received from the second signal source.

7. The apparatus of claim 1, further comprising stored instructions that when executed cause the processor to:
select a first signal source for receiving parameters of a first portion of a ride of the vehicle;
receive motion parameters describing the first portion of the ride of the vehicle based on data received from the first signal source;
select a second signal source for a second portion of the ride, responsive to determining that the accuracy of the first signal source is below a threshold; and
receive motion parameters describing the second portion of the ride of the vehicle based on data received from the second signal source.

8. The apparatus of claim 1, further comprising, one or more of:
a clock; and
a wireless transceiver.

9. The apparatus of claim 1, wherein a local signal source represents one of:
a GPS chip,
a motion sensor,
an accelerometer,
a magnetometer,
a wireless transceiver, or
a camera.

10. A method for determining accurate motion parameters for a vehicle, the method comprising:
collecting data from a plurality of signal sources, the data comprising motion parameters for a portion of a ride of a vehicle, wherein the plurality of signal sources comprises one or more of local signal sources or external signal sources;
for each of a plurality of portions of the ride:
evaluating accuracy of each signal source from the plurality of signal sources by executing a machine learning model on at least a portion of the motion parameters for the portion of the ride to generate metadata for the portion of the ride, wherein the metadata comprises an accuracy threshold value for each signal source from the plurality of signal sources for the portion of the ride;
executing a rule engine to dynamically select one or more signal sources based on the accuracy threshold value of the corresponding signal sources for the portion of the ride;
determining a set of accurate motion parameters describing the portion of the ride based on data received from the one or more selected signal sources, the set of accurate motion parameters comprising one or more of: speed of the vehicle, time duration of the portion of ride, acceleration of the vehicle, and location of the vehicle.

11. The method of claim 10, further comprising:
dynamically selecting a signal source for the portion of the ride based on availability of data from the signal source.

12. The method of claim 10, further comprising:
determining a measure of accuracy of data received from one or more signal sources; and
selecting the signal source for the portion of ride based on the measures of accuracy of the one or more signal sources.

13. The method of claim 10, wherein selecting one or more signal sources comprises:
evaluating an expression based on ride parameters describing the portion of the ride.

14. The method of claim 13, wherein a ride parameter represents one or more of:
make and model of the vehicle,
make and model of the apparatus,
location of the vehicle,
acceleration of the vehicle,
speed of the vehicle,
the time of day,
a day of the week, or
time of at least a portion of the ride.

15. The method of claim 10, further comprising:
determining that the accuracy of a first signal source is below a threshold value;
identifying a second signal source having a high measure of accuracy compared to the first signal source; and
calibrating the first signal source based on the data received from the second signal source.

16. The method of claim 10, further comprising:
selecting a first signal source for receiving parameters of a first portion of a ride of the vehicle;
receiving motion parameters describing the first portion of the ride of the vehicle based on data received from the first signal source;
selecting a second signal source for a second portion of the ride, responsive to determining that the accuracy of the first signal source is below a threshold; and
receiving motion parameters describing the second portion of the ride of the vehicle based on data received from the second signal source.

17. The method of claim 10, wherein a local signal source represents one of:
a GPS chip,
a motion sensor,
an accelerometer,
a magnetometer,
a wireless transceiver, or
a camera.

18. A non-transitory computer readable storage medium comprising stored instructions, the instructions when executed cause a processor to:
collect data from a plurality of signal sources, the data comprising motion parameters for a portion of a ride of a vehicle, wherein the plurality of signal sources comprises one or more of local signal sources or external signal sources;
for each of a plurality of portions of the ride:
evaluate accuracy of each signal source from the plurality of signal sources by executing a machine learning model on at least a portion of the motion parameters for the portion of the ride to generate metadata for the portion of the ride, wherein the metadata comprises an accuracy threshold value for each signal source from the plurality of signal sources for the portion of the ride;
execute a rule engine to dynamically select one or more signal sources based on the accuracy threshold value of the corresponding signal sources for the portion of the ride; and
determine a set of accurate motion parameters describing the portion of the ride based on data received from the one or more selected signal sources, the set of accurate motion parameters comprising one or more of: speed of the vehicle, time duration of the portion of ride, acceleration of the vehicle, and location of the vehicle.

19. The non-transitory computer readable storage medium of claim 18, further comprising stored instructions that when executed cause the processor to:
dynamically select a signal source for the portion of the ride based on availability of data from the signal source.

20. The non-transitory computer readable storage medium of claim 18, further comprising stored instructions that when executed cause the processor to:
determine a measure of accuracy of data received from one or more signal sources; and select the signal source for the portion of ride based on the measures of accuracy of the one or more signal sources.

\* \* \* \* \*